United States Patent
Liu et al.

(10) Patent No.: US 11,518,393 B2
(45) Date of Patent: Dec. 6, 2022

(54) VEHICLE TRAJECTORY DYNAMICS VALIDATION AND INTERPOLATION

(71) Applicant: UATC, LLC, San Francisco, CA (US)

(72) Inventors: Chenggang Liu, Pittsburgh, PA (US); David Mcallister Bradley, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/005,667

(22) Filed: Aug. 28, 2020

(65) Prior Publication Data

US 2022/0032925 A1 Feb. 3, 2022

Related U.S. Application Data

(60) Provisional application No. 63/059,442, filed on Jul. 31, 2020.

(51) Int. Cl.
*B60W 40/10* (2012.01)
*B60W 50/06* (2006.01)
*B60W 50/00* (2006.01)

(52) U.S. Cl.
CPC ........ *B60W 40/10* (2013.01); *B60W 50/0098* (2013.01); *B60W 50/06* (2013.01); *B60W 2520/06* (2013.01); *B60W 2520/105* (2013.01); *B60W 2520/14* (2013.01); *B60W 2552/30* (2020.02)

(58) Field of Classification Search
None
See application file for complete search history.

(56) References Cited

U.S. PATENT DOCUMENTS

| | | | | |
|---|---|---|---|---|
| 6,507,127 B1 * | 1/2003 | Amano | ................... | B60L 50/61 290/400 |
| 7,849,944 B2 * | 12/2010 | DeVault | ................ | B60W 10/26 180/65.265 |
| 8,428,804 B2 * | 4/2013 | Sakai | ........................ | B60L 1/00 180/65.28 |
| 8,433,466 B2 * | 4/2013 | Yamada | ................... | B60K 6/46 180/65.265 |
| 8,548,660 B2 * | 10/2013 | Thai-Tang | ............ | B60W 10/08 701/400 |
| 8,600,672 B2 * | 12/2013 | Hidaka | ................. | B60W 10/06 903/903 |

(Continued)

*Primary Examiner* — Jonathan M Dager
(74) *Attorney, Agent, or Firm* — Dority & Manning, P.A.

(57) ABSTRACT

Systems, devices, and methods for validating vehicle trajectories are provided. A vehicle controller can obtain a motion plan indicative of a trajectory including one or more state variables and one or more control variables. The vehicle controller can determine a dynamics defect value for the motion plan based at least in part on the one or more state variables, the one or more control variables, and a continuous-time dynamics function comprising a function indicative of a change in the one or more state variables and the one or more control variables over time. The vehicle controller can further determine the motion plan is dynamically consistent based at least in part on the dynamics defect value, generate one or more vehicle system control signals, and control the autonomous vehicle based at least in part on the one or more vehicle system control signals.

17 Claims, 6 Drawing Sheets

(56) References Cited

U.S. PATENT DOCUMENTS

| | | | | |
|---|---|---|---|---|
| 8,615,342 B2* | 12/2013 | Suganuma | B60W 20/12 | 180/65.265 |
| 8,755,993 B2* | 6/2014 | Calkins | G01C 21/3469 | 701/410 |
| 8,862,374 B2* | 10/2014 | Maura | G01C 21/3697 | 701/123 |
| 9,008,858 B1* | 4/2015 | Payne | B60G 17/0195 | 701/1 |
| 9,008,955 B2* | 4/2015 | Tate, Jr. | G01C 21/3469 | 701/123 |
| 9,067,589 B1* | 6/2015 | Zhao | B60W 20/13 | |
| 9,151,630 B2* | 10/2015 | Miura | G01C 21/3469 | |
| 9,157,756 B2* | 10/2015 | Mason | G06Q 10/063112 | |
| 9,208,626 B2* | 12/2015 | Davidson | G06Q 10/06398 | |
| 9,266,529 B2* | 2/2016 | Dufford | B60W 20/12 | |
| 9,272,712 B2* | 3/2016 | Meyer | G07C 5/085 | |
| 9,291,468 B2* | 3/2016 | Tate, Jr. | G01C 21/3446 | |
| 9,327,712 B2* | 5/2016 | Matthews | B60W 20/12 | |
| 9,361,271 B2* | 6/2016 | Mukhopadhyay | B60W 40/09 | |
| 9,440,655 B2* | 9/2016 | Roos | B60W 30/182 | |
| 9,527,399 B2* | 12/2016 | Kim | B60L 50/15 | |
| 9,613,466 B1* | 4/2017 | Bullock | G07C 5/00 | |
| 9,631,940 B2* | 4/2017 | Eikelenberg | G01C 21/3469 | |
| 9,714,837 B2* | 7/2017 | North | H02J 7/14 | |
| 9,759,573 B2* | 9/2017 | Meyer | G01C 21/3469 | |
| 9,803,994 B1* | 10/2017 | Rodoni | G06F 3/0486 | |
| 9,884,630 B1* | 2/2018 | Ross | G07C 5/0808 | |
| 10,048,082 B2* | 8/2018 | Meyer | G01C 21/3469 | |
| 10,118,606 B2* | 11/2018 | Ogawa | B60W 20/14 | |
| 10,137,880 B2* | 11/2018 | Ogawa | B60W 20/14 | |
| 10,295,355 B2* | 5/2019 | Baglino | G01C 21/3697 | |
| 10,647,327 B2* | 5/2020 | Froeschl | B60W 50/0098 | |
| 10,890,459 B2* | 1/2021 | Matsumura | G01C 21/3453 | |
| 10,989,549 B2* | 4/2021 | Ba | G01C 21/343 | |
| 11,067,403 B2* | 7/2021 | Lindemann | G07C 5/0808 | |
| 11,117,475 B2* | 9/2021 | Cserna | B60W 50/0097 | |
| 2002/0188387 A1* | 12/2002 | Woestman | B60L 50/16 | 180/65.235 |
| 2007/0005237 A1* | 1/2007 | Needham | G01C 21/3469 | 701/123 |
| 2008/0021628 A1* | 1/2008 | Tryon | B60W 20/00 | 701/99 |
| 2008/0262668 A1* | 10/2008 | Yamada | B60K 6/46 | 701/22 |
| 2008/0319596 A1* | 12/2008 | Yamada | B60L 50/61 | 903/930 |
| 2009/0198398 A1* | 8/2009 | Yamada | G01C 21/3469 | 903/930 |
| 2010/0088012 A1* | 4/2010 | O'Sullivan | G01C 21/3469 | 701/532 |
| 2010/0121514 A1* | 5/2010 | Kato | B60K 6/48 | 701/22 |
| 2010/0131139 A1* | 5/2010 | Sakai | B60K 6/46 | 903/903 |
| 2010/0305799 A1* | 12/2010 | Yamada | B60W 10/26 | 180/65.265 |
| 2011/0022255 A1* | 1/2011 | Yamada | B60K 6/46 | 180/65.265 |
| 2011/0029168 A1* | 2/2011 | Tai | B60W 20/12 | 903/903 |
| 2011/0054768 A1* | 3/2011 | Sullivan | B60W 10/06 | 701/123 |
| 2011/0060495 A1* | 3/2011 | Kono | G01C 21/3469 | 701/31.4 |
| 2011/0153127 A1* | 6/2011 | Weslati | G01C 21/26 | 701/1 |
| 2011/0166740 A1* | 7/2011 | Desborough | B60W 10/08 | 701/31.4 |
| 2011/0184622 A1* | 7/2011 | Yamada | B60W 40/02 | 701/99 |
| 2011/0238457 A1* | 9/2011 | Mason | G06Q 10/063112 | 705/7.14 |
| 2011/0251744 A1* | 10/2011 | Amano | F02D 29/02 | 180/65.265 |
| 2012/0010767 A1* | 1/2012 | Phillips | B60W 50/0097 | 180/65.21 |
| 2012/0016576 A1* | 1/2012 | Huang | G01C 21/3469 | 701/423 |
| 2012/0032637 A1* | 2/2012 | Kotooka | B60L 50/61 | 320/109 |
| 2012/0197468 A1* | 8/2012 | Frederick | B60W 10/08 | 903/903 |
| 2013/0006458 A1* | 1/2013 | Bhattarai | B60W 20/15 | 180/65.265 |
| 2013/0024055 A1* | 1/2013 | Hysko, Jr. | B60L 58/15 | 180/65.265 |
| 2013/0096745 A1* | 4/2013 | Hussain | B60W 20/12 | 180/65.265 |
| 2013/0116870 A1* | 5/2013 | Harty | B60W 20/00 | 903/903 |
| 2013/0151047 A1* | 6/2013 | Choi | B60L 15/2045 | 701/410 |
| 2013/0226367 A1* | 8/2013 | MacNeille | B60R 16/0236 | 701/1 |
| 2013/0274952 A1* | 10/2013 | Weslati | B60W 40/02 | 701/1 |
| 2014/0032087 A1* | 1/2014 | Shiri | G01C 21/3469 | 701/123 |
| 2014/0046595 A1* | 2/2014 | Segawa | G01C 21/3676 | 701/400 |
| 2014/0277835 A1* | 9/2014 | Filev | G01C 21/3469 | 701/2 |
| 2015/0005999 A1* | 1/2015 | Choi | F02D 29/02 | 903/903 |
| 2015/0066270 A1* | 3/2015 | Ogawa | B60L 58/12 | 701/400 |
| 2015/0275787 A1* | 10/2015 | Dufford | B60W 10/08 | 701/112 |
| 2016/0245662 A1* | 8/2016 | Rajagopalan | G01C 21/3469 | |
| 2016/0304080 A1* | 10/2016 | Sugiyama | B60W 30/16 | |
| 2017/0036663 A1* | 2/2017 | Kim | B60W 50/0097 | |
| 2017/0232952 A1* | 8/2017 | Blasinski | B60K 6/48 | 701/22 |
| 2018/0058868 A1* | 3/2018 | Kang | B60W 20/12 | |
| 2018/0162359 A1* | 6/2018 | Perkins | B60W 20/14 | |
| 2019/0016329 A1* | 1/2019 | Park | B60K 6/32 | |
| 2021/0146785 A1* | 5/2021 | Wang | G06N 5/04 | |
| 2021/0155226 A1* | 5/2021 | Gao | G06F 16/9035 | |
| 2021/0253128 A1* | 8/2021 | Nister | B60W 60/0027 | |
| 2021/0287262 A1* | 9/2021 | Abbott | G06Q 30/0282 | |
| 2021/0348934 A1* | 11/2021 | Gaither | B60W 60/0011 | |

* cited by examiner

VEHICLE TRAJECTORY DYNAMICS VALIDATION AND INTERPOLATION

PRIORITY CLAIM

The present application is based on and claims benefit of U.S. Provisional Application 63/059,442 having a filing date of Jul. 31, 2020, which is incorporated by reference herein.

FIELD

The present disclosure relates generally to devices, systems, and methods for validating motion plan trajectory dynamics for autonomous vehicles.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a vehicle controller. The vehicle controller can include one or more processors and a memory comprising one or more tangible non-transitory computer-readable media. The media can store computer-readable instructions that when executed by the one or more processors cause the one or more processors to perform operations. The operations can include obtaining a motion plan. The motion plan can be indicative of a trajectory for an autonomous vehicle. The motion plan can include one or more state variables and one or more control variables. The operations can further include determining a dynamics defect value for the motion plan based at least in part on the one or more state variables, the one or more control variables, and a continuous-time dynamics function comprising a function indicative of a change in the one or more state variables and the one or more control variables over time. The operations can further include determining the motion plan is dynamically consistent based at least in part on the dynamics defect value. In response to determining the motion plan is dynamically consistent, the operations can further include generating one or more vehicle system control signals. The operations can further include controlling the autonomous vehicle based at least in part on the one or more vehicle system control signals.

Another example aspect of the present disclosure is directed to a method for controlling an autonomous vehicle. The method can include obtaining, by a computing system comprising one or more computing devices, a motion plan. The motion plan can be indicative of a trajectory for an autonomous vehicle. The motion plan can include one or more state variables and one or more control variables. The method can further include determining, by the computing system, a dynamics defect value for the motion plan based at least in part on the one or more state variables, the one or more control variables, and a continuous-time dynamics function comprising a function indicative of a change in the one or more state variables and the one or more control variables over time. The method can further include determining, by the computing system, whether the motion plan is dynamically consistent based at least in part on the dynamics defect value. In response to determining the motion plan is dynamically consistent, the method can further include generating one or more vehicle system control signals. The method can further include controlling the autonomous vehicle based at least in part on the one or more vehicle system control signals.

Another example aspect of the present disclosure is directed to an autonomous vehicle. The autonomous vehicle can include a vehicle autonomy system comprising one or more processors. The vehicle autonomy system can be configured to generate a motion plan. The motion plan can be indicative of a trajectory for the autonomous vehicle. The motion plan can include one or more state variables and one or more control variables. The autonomous vehicle can further include a vehicle controller comprising one or more processors and a memory comprising one or more tangible non-transitory computer-readable media. The media can store computer-readable instructions that when executed by the one or more processors cause the one or more processors to perform operations. The operations can include obtaining, from the vehicle autonomy system, the motion plan. The operations can further include determining a dynamics defect value for the motion plan based at least in part on the one or more state variables, the one or more control variables, and a continuous-time dynamics function comprising a function indicative of a change in the one or more state variables and the one or more control variables over time. The operations can include validating the motion plan based at least in part on the dynamics defect value. In response to validating the motion plan, the operations can include generating one or more vehicle system control signals. The operations can include controlling the autonomous vehicle based at least in part on the one or more vehicle system control signals.

Other aspects of the present disclosure are directed to various systems, apparatuses, non-transitory computer-readable media, vehicles, and computing devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
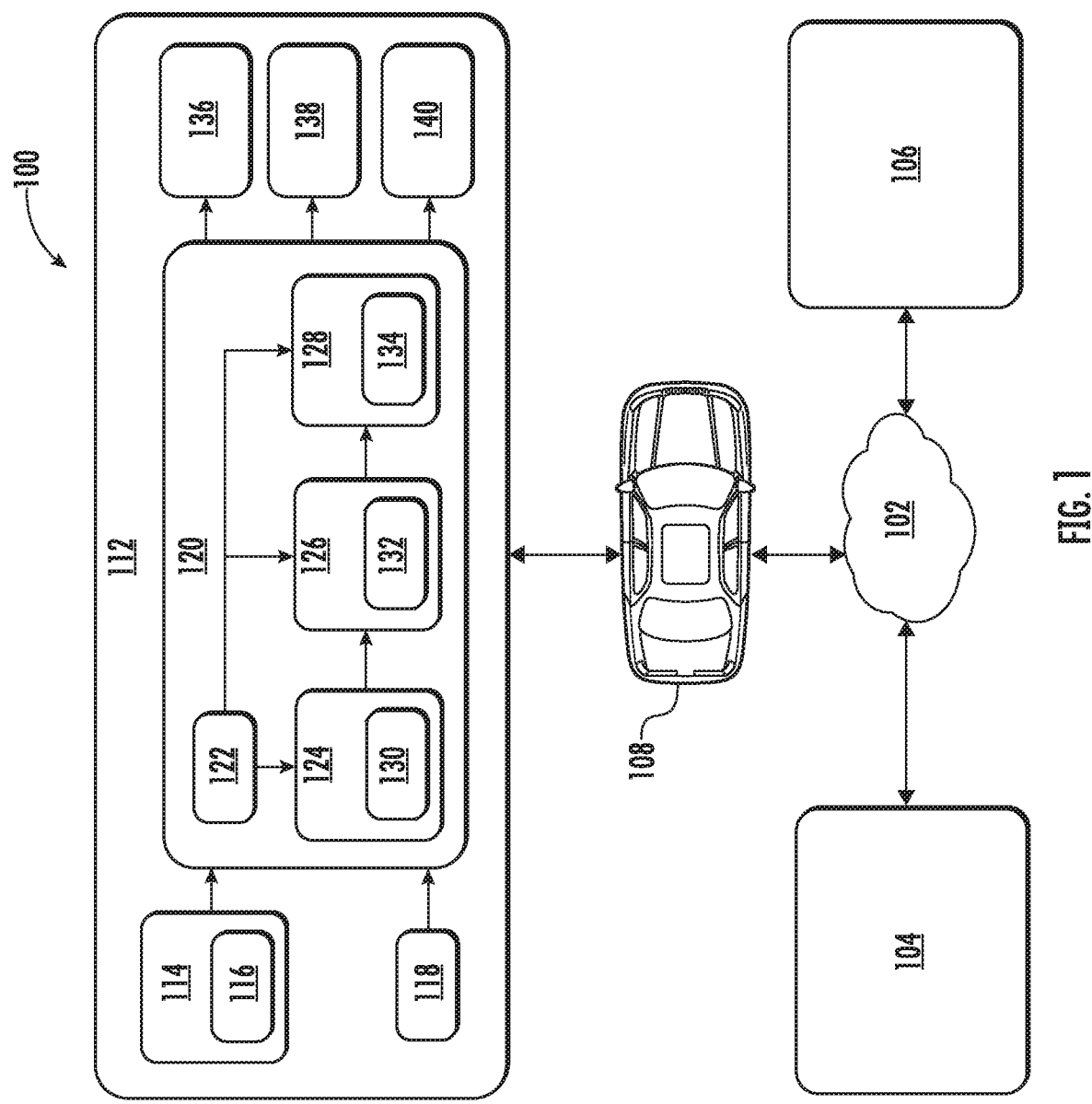
FIG. 1 depicts a diagram of an example system according to example aspects of the present disclosure.

Example aspects of the present disclosure are directed to validating and implementing motion plans for autonomous vehicles. For example, the present disclosure can be used by a vehicle controller (e.g., implementing a vehicle interface module) to determine whether a motion plan received from a vehicle autonomy system is dynamically feasible. Further, the vehicle controller can use one or more interpolation methods of the present disclosure to generate control signals which can be provided to one or more vehicle control systems in order to implement the motion plan. By way of example, the vehicle controller can obtain a motion plan (e.g., a trajectory), such as from a vehicle autonomy system. The motion plan can include one or more state variables and one or more control variables. In some implementations, the state variables and/or the control variables can change over time, and thus may not satisfy a discrete-time dynamics function. The vehicle controller can determine a dynamics defect value for the motion plan using a continuous-time dynamics function, the one or more state variables, and the one or more control variables. The vehicle controller can then determine whether the motion plan is dynamically feasible (e.g., able to be implemented within a vehicle's limits and dynamics), by, for example, comparing state and/or control variables to vehicle limits and comparing the dynamics defect value to a threshold. Upon validating the dynamics feasibility of the motion plan, the vehicle controller can generate one or more vehicle system control signals (e.g., steering commands, braking commands, acceleration commands, etc.) based on the motion plan, and control the autonomous vehicle by sending the vehicle system control signals to the associated vehicle systems. In this way, a motion plan which includes one or more state and/or control variables that change over time can be dynamics validated and implemented by an autonomous vehicle, thereby allowing for smoother (e.g., higher-order polynomial) trajectories to be implemented in autonomous vehicle operation.

More particularly, an autonomous vehicle can be a ground-based autonomous vehicle (e.g., car, truck, bus, etc.), an air-based autonomous vehicle (e.g., airplane, drone, helicopter, or other aircraft), a light electric vehicle, and/or other types of vehicles (e.g., watercraft). In some implementations, the autonomous vehicle can include a vehicle autonomy system that assists in controlling the autonomous vehicle. For example, the vehicle autonomy system can include one or more processors and one or more memory devices, and can include one or more subsystems to assist in autonomous operation. For example, in some implementations, the vehicle autonomy system can include a perception system, a prediction system, and a motion planning system that cooperate to perceive the surrounding environment of the autonomous vehicle and determine a motion plan for controlling the motion of the autonomous vehicle accordingly. As further described herein, the output of the vehicle autonomy system (the motion planning system) can be used to control one or more vehicle control systems (e.g., steering, braking, acceleration, etc.) of the autonomous vehicle.

The vehicle control system(s) can be associated with a vehicle controller. The vehicle controller can include, for example, a vehicle interface that is configured to implement a motion plan. The vehicle controller can serve as an interface/conduit between the autonomy computing system and the vehicle control systems of the autonomous vehicle and any associated electrical/mechanical controllers associated therewith. The vehicle controller can, for example, translate a motion plan into instructions for the appropriate vehicle control system (e.g., acceleration control, brake control, steering control, etc.). By way of example, the vehicle controller can translate a determined motion plan into instructions to adjust the steering of the vehicle "X" degrees, apply a certain magnitude of braking force, increase/decrease speed, etc. The vehicle controller can help facilitate the responsible vehicle control (e.g., braking control system, steering control system, acceleration control system, etc.) to execute the instructions and implement a motion plan (e.g., by sending control signal(s), making the translated plan available, etc.). This can allow the autonomous vehicle to autonomously travel within the vehicle's surrounding environment.

For example, in some implementations, the motion plan can be indicative of a trajectory for an autonomous vehicle and can include one or more state variables and/or one or more control variables. The one or more state variables can be indicative of a state of the vehicle, and the one or more control variables can be used to control the vehicle to follow the trajectory. For example, the one or more state variables can include a position (e.g., $p_x$, $p_y$), a velocity, an acceleration (e.g., a change in velocity), a yaw (e.g., an orientation), a curvature, an odometer (e.g., distance traveled), and/or a change in curvature (e.g., dcurv). In some implementations, the one or more control values can include a jerk (e.g., a change in acceleration) and/or a ddcurv (a second order derivative of curvature and a first order derivative of dcurv).

In some implementations, the trajectory can be defined by a spatial path and/or steering quantities. For example, the spatial path may be a vector-valued (e.g., x, y, yaw) continuous function of arclength. Curvature is a value that can be derived from the continuous function. Steering qualities can include, but are not limited to, the first and second derivative of curvature, steering angle, steering angle velocity, angular velocity, lateral speed, lateral acceleration, lateral jerk, derivatives with respect to arclength, and so on. A trajectory can also be associated with a particular period (e.g., 5 s, 8 s, 10 s, etc.) that indicates the time the vehicle may travel along the trajectory's path with the associated parameters (e.g., velocity, acceleration, etc.). In some examples, the period can be associated with a planning cycle of the vehicle's motion planning system. In some implementations, the trajectory can be defined using one or more polynomials, such as a smoothed polynomial motion plan using higher order polynomials (e.g., hepatic, quintic, etc.). Using higher order polynomials to define the trajectory can allow for improved smoothness as compared to piecewise and/or lower order trajectories. For example, the state and control variables in a higher order polynomial trajectory may continuously change over time, thereby eliminating discontinuities (e.g., jumps) that may be present in piecewise trajectories.

However, traditional methods for validating dynamics feasibility rely on the control variables remaining constant between sample points, as in a piecewise trajectory. For example, various constraint checks can be performed to ensure that the state and control variable parameters are bounded and continuous. However, depending on when sampling is performed, a trajectory including one or more continuously-changing (e.g., changing over time) variables may appear to satisfy such constraint checks even though the trajectory may actually be dynamically inconsistent (e.g. outside the vehicle's limits).

The systems and methods of the present disclosure, however, can allow for a vehicle controller to obtain a motion plan including a trajectory with one or more continuously-changing variables and determine whether the motion plan is dynamically consistent. For example, a vehicle controller (e.g., a controller implementing or otherwise including a vehicle interface module) can receive a motion plan from the vehicle autonomy system. In some implementations, the vehicle controller can be incorporated into the vehicle autonomy system. The motion plan can be indicative of a trajectory for an autonomous vehicle and can include one or more state variables and one or more control variables.

The vehicle controller can then determine a dynamics defect value for the motion plan based at least in part on the one or more state variables, the one or more control variables, and a continuous-time dynamics function comprising a function indicative of a change in the one or more state variables and the one or more control variables over time. For example, in some implementations, the dynamics defect value can be determined by determining a trapezoidal integration of the continuous-time dynamics function. For example, in some implementations, the dynamics defect value (e.g., defect($h_k$)) can be defined by the equation: dynamics defect value=$x_k$+0.5*$h_k$*[f($x_{k+1}$, $u_{k+1}$)+f($x_k$, $u_k$)]−$x_{k+1}$, where ($x_k$, $u_k$) and ($x_{k+1}$, $u_{k+1}$) are the one or more state variables x and the one or more control variables u at times $t_k$ and $t_{k+1}$, $h_k$ is the duration between $t_k$ and $t_{k+1}$, and f( ) is the continuous-time dynamics function of the one or more state variables x and the one or more control variables u.

In some implementations, the vehicle controller can determine that the motion plan is dynamically consistent by determining that the dynamics defect value is less than a threshold. For example, for a duration $h_k$, the vehicle controller can determine that a motion plan is dynamically consistent when the |defect($h_k$)| is less than a threshold c (e.g., −c<defect($h_k$)<c). For example, the threshold c can be selected to be small enough such that it can capture as many dynamically inconsistent plans but the potential tracking error caused by the dynamics defect can still be negligible compared to other errors, such as localization errors and measurement errors. Stated differently, when the dynamics defect value is sufficiently small enough over a particular period $h_k$, the motion plan can be determined to be capable of being implemented by the autonomous vehicle within the vehicle's limits given an initial position along the motion plan.

In some implementations, when the vehicle controller determines that the motion plan is not dynamically consistent, the vehicle controller can provide a command to the vehicle autonomy system to provide a different motion plan. For example, the vehicle controller can communicate a command to the vehicle autonomy system (e.g., over a controller area network (CAN), and in response, the vehicle autonomy system can provide an updated motion plan.

According to additional aspects of the present disclosure, the vehicle controller can be further configured to generate one or more vehicle systems control signals in response to determining the motion plan is dynamically consistent. For example, in some implementations, the vehicle controller can convert the motion plan to various setpoints for one or more vehicle control systems, such as braking systems, acceleration systems, steering systems, etc.

For example, in some implementations, generating the one or more vehicle system control signals can include interpolating the one or more state variables and the one or more control variables to a particular time step. The particular time step can be, for example, an intermediate point in time along the trajectory between one or more discrete points (e.g., an initial position and an ending position).

In some implementations, interpolating the one or more state variables and the one or more control variables can include performing linear interpolation. For example, $pos_x$=$x_0$+($x_1$−$x_0$)*t/T, where $x_0$ is an initial position (at time 0), $x_1$ is an ending position at time 1, T is length of the time period between the initial position and the ending position, and t is the particular time step corresponding to an intermediate time point. Similarly, $pos_y$=$y_0$+($y_1$−$y_0$)*t/T; yaw=$yaw_0$+($yaw_1$−$yaw_0$)*t/T; etc.

In some implementations, interpolating the one or more state variables and the one or more control variables can include performing cubic spline interpolation. For example, the vehicle controller can determine the cubic spline for $pos_x$ and $pos_y$ by solving for the polynomial coefficients that satisfy x, x', y, and y' at the sample points using the formula x (or y)=$at^3$+$bt^2$+ct+d. Once the spline of x and y have been determined, the speed, acceleration, heading angle (yaw) and curvature can be interpolated.

In some implementations, interpolating the one or more state variables and the one or more control variables can include performing dynamics interpolation. For example, linear interpolation can be performed for the control variables using the formula u(t)=$u_k$+t/$h_k$($u_{k+1}$−$u_k$). Quadratic interpolation can then be performed for the state variables using the continuous-time dynamics formula x(t)=$x_k$+f($x_k$, $u_k$)t+$0.5t^2$/$h_k$[f($x_{k+1}$, $u_{k+1}$) f($x_k$, $u_k$)].

By interpolating to a particular time point, the vehicle controller can determine one or more vehicle control system signals at the particular time point using the trajectory. Further, the vehicle controller can control an autonomous vehicle based at least in part on the one or more vehicle systems control signals by, for example, providing the vehicle control signals to the respective vehicle control system, such as over a CAN.

The systems and methods of the present disclosure can provide any number of technical effects and benefits. More particularly, the systems and methods of the present disclosure provide improved techniques to validate that motion plans obtained from a vehicle autonomy system are dynamically consistent. In turn, this can help to ensure that an autonomous vehicle is operated within vehicle limits. For example, a vehicle controller can determine a dynamics defect value using a continuous-time dynamics function. The vehicle controller can compare the determined dynamics defect value to a threshold to determine whether the motion plan is dynamically consistent. Further, the vehicle controller can use one or more interpolation techniques to generate vehicle system control signals, which can be used to control vehicle control systems in order to implement the motion plan.

Additionally, the systems and methods of the present disclosure can allow for smoothed polynomial trajectories which do not necessarily satisfy discrete-time dynamics equations to be implemented in autonomous vehicles. In turn, the systems and methods of the present disclosure can allow for improved path selection for autonomous vehicles and allow such vehicles to be controlled in a manner that increases safety, improves passenger ride quality, reduces travel time and unnecessary delays, and conserves fuel and processing power that would otherwise be wasted through less efficient path planning solutions.

The systems and methods of the present disclosure can further allow for improved compatibility with an enhanced variety of motion plan types. For example, the continuous-time dynamics approach provided by the systems and methods of the present disclosure can be used with previously-developed motion plan types, such as motion plans which relied on discrete-time dynamics in which the control variables remain constant between sample points. Thus, the systems and methods of the present disclosure can allow for a single vehicle controller to be used with a variety of vehicle autonomy systems and vehicle motion plans.

Various means can be configured to perform the methods and processes described herein. For example, a computing system can include data obtaining unit(s), dynamics defect value determination unit(s), dynamics feasibility validation unit(s), interpolation unit(s), control signal generation unit(s), control unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain a motion plan from a vehicle autonomy system. The means can be configured to communicate with the vehicle autonomy system (e.g., such as over a CAN) to obtain the motion plan. The motion plan can be indicative of a trajectory for an autonomous vehicle. For example, the motion plan can include one or more state variables and/or one or more control variables, which can include state variables and/or control variables which change over time.

The means can be configured to determine a dynamics defect value for the motion plan based at least in part on the one or more state variables, the one or more control variables, and a continuous-time dynamics function comprising a function indicative of a change in the one or more state variables and the one or more control variables over time. For example, in some implementations, the dynamics defect value can be determined using a trapezoidal integration of the continuous-time dynamics function. In some implementations, the dynamics defect value can be determined by multiplying a time duration parameter ($h_k$) by 0.5 and the summation of a continuous-time dynamics function at a time k+1 ($f(x_{k+1}, u_{k+1})$)) and the continuous-time dynamics function at a time k ($f(x_k, u_k)$), adding the state variable at the time k ($x_k$), and subtracting the state variable at the time k+1 ($x_{k+1}$), where $x_k$ comprises the one or more state variables at the time k, and $u_k$ comprises the one or more control variables at the time k.

The means can be configured to determine the motion plan is dynamically consistent based at least in part on the dynamics defect value. For example, the means can validate a motion plan by comparing the dynamics defect value to a threshold. In some implementations, when the magnitude of the dynamics defect value is less than the threshold, the motion plan can be validated.

The means can be configured to generate one or more vehicle system control signals. For example, in response to determining a motion plan is dynamically consistent, the means can be configured to convert the motion plan to one or more vehicle system control signals, such as braking system control signals, acceleration system control signals, steering system control signals, etc. In some implementations, the means can generate the one or more vehicle system control signals by interpolating the one or more state variables and the one or more control variables to a particular time step. For example, in various implementations, the means can perform at least one of linear interpolation, cubic spline interpolation, or dynamics interpolation.

The means can be configured to control an autonomous vehicle based at least in part on the one or more vehicle system control signals. For example, in some implementations, the means can be configured to communicate the one or more vehicle system control signals to one or more vehicle control systems, such as over a CAN.

With reference now to the FIGS., FIG. 1 depicts a diagram of an example system 100 according to example aspects of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions that can be performed by the one or more remote computing devices 106 and/or the vehicle computing system 112.

In some implementations, the one or more operations and/or functions performed by the operations computing system 104 can include controlling the operation of a device (e.g., an autonomous vehicle). Furthermore, the operations computing system 104 can be configured to monitor and communicate with the vehicle 108 and/or its users to coordinate a vehicle service provided by the vehicle 108. The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108.

The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a: ground-based vehicle which can include an automobile, a motorcycle, a truck, a bus, a train, a tram, a tracked vehicle, a light electric vehicle, a moped, a scooter, and/or an electric bicycle; an aircraft which can include an airplane, a drone aircraft, a vertical take-off and landing (VTOL) craft, and/or helicopter; a boat; a submersible vehicle which can include a submarine; an amphibious vehicle; a hovercraft; a robotic device including a bipedal, wheeled, or quadrupedal robotic device; and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data (e.g., sensor data, state data, etc.) to the operations computing system 104, which can store an indication, record, and/or other data in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions that can be performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including any of the operations and/or functions that can be performed by any of the operations computing system 104, and/or the one or more remote computing devices 106.

Furthermore, the vehicle computing system 112 can perform one or more operations associated with the control, exchange of data, and/or operation of various devices and systems including autonomous devices, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store sensor data 116 associated with one or more objects that are proximate to the vehicle 108 (e.g., within range or a field of view of one or more of the one or more sensors 114). The one or more sensors 114 can include one or more LiDAR systems, one or more radar systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, cyclists, vehicles, bicycles, buildings, roads, sidewalks, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108. For example, the motion plan data 134 can include one or more state variables and/or one or more control variables. For example, in some implementations, the one or more state variables can include a position, velocity, acceleration, yaw, curvature, odometer, and/or a change in curvature. In some implementations, the one or more control variables can include a jerk and/or ddcurv. Other state and/or control variables can similarly be included in motion plan data 134.

In some implementations, the motion plan data 134 can include one or more state variables and/or control variables which change over time (e.g., are continuously-changing). For example, in some implementations, the motion plan data 134 can include a spatial-temporal trajectory (e.g., a basis path) which may be defined by one or more polynomials (e.g., hepatic, quantic, etc.)

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller (e.g., a vehicle controller) configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134. An example vehicle controller 134 according to example aspects of the present disclosure is discussed in greater detail with respect to FIG. 2.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the vehicle 108 to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some implementations, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
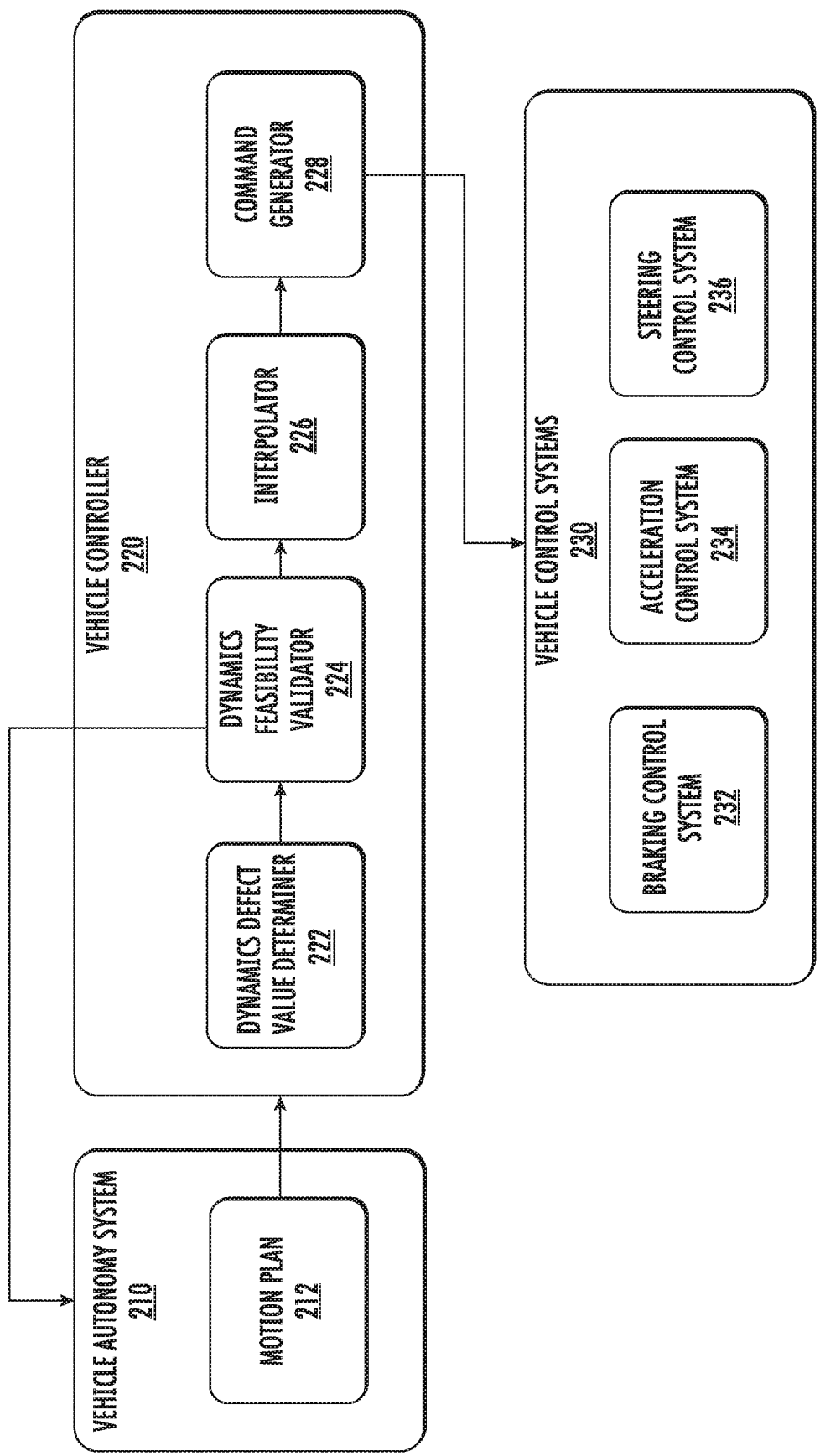
FIG. 2 depicts a diagram of an example vehicle controller architecture according to example aspects of the present disclosure.

Referring now to FIG. 2, an example vehicle controller 220 according to example aspects of the present disclosure is depicted. The vehicle controller 220 can be configured to perform one or more operations and/or functions, and can include, for example, one or more devices (e.g., one or more computing devices).

As shown, a vehicle autonomy system 210 can generate a motion plan 212. The vehicle autonomy system 210 can correspond to, for example, the vehicle autonomy system 120 depicted in FIG. 1. The motion plan 212 can correspond to, for example, the motion plan data 134 depicted in FIG. 1.

As shown, the vehicle controller 220 can obtain the motion plan 212. For example, in some implementations, the vehicle controller 220 can obtain the motion plan from the vehicle autonomy system 210. In some implementations, the vehicle controller 220 can be implemented as a part of the vehicle autonomy system 210, and can obtain the motion plan 212 from, for example, the motion planning system 128 depicted in FIG. 1.

The vehicle controller 220 can use a dynamics defect value determiner 222. For example, the dynamics defect value determiner 222 can be configured to determine a dynamics defect value for the motion plan 212. For example, the motion plan 212 can include one or more state variables and/or one or more control variables, which in some implementations may change over time. The dynamics defect value determiner 222 can determine a dynamics defect value using the one or more state variables and/or the one or more control variables, as well as a continuous-time dynamics function comprising a function indicative of a change in the one or more state variables and/or the one or more control variables over time. In some implementations, the dynamics defect value determiner 222 can determine the dynamics defect value by determining a trapezoidal integration of the continuous-time dynamics function.

For example, the continuous-time function can be denoted as f( ) and the one or more state variables can be denoted as x and the one or more control variables can be denoted as u. Further, $h_k$ can be the duration between $t_k$ and $t_{k+1}$, and ($x_k$, $u_k$) and ($x_{k+1}$, $u_{k+1}$) can be the one or more state variables x and the one or more control variables u at times $t_k$ and $t_{k+1}$. The dynamics defect value determiner 222 can then determine the dynamics defect value using the following: dynamics defect value=$x_k + 0.5 * h_k * [f(x_{k+1}, u_{k+1}) + f(x_k, u_k)] - x_{k+1}$.

The dynamics defect value determiner 222 can then provide the dynamics defect value to the dynamics feasibility validator 224. For example, the dynamics feasibility validator 224 can determine whether the motion plan 212 is dynamically consistent (e.g., able to be implemented within vehicle limits) using the dynamics defect value determined by the dynamics defect value determiner 222.

For example, in some implementations, the dynamics feasibility validator 224 can compare the dynamics defect value to one or more thresholds. For example, the defect($h_k$) for a small duration $h_k$ can be compared to a threshold c. The threshold c can be selected (e.g., tuned) to a specific vehicle. The dynamics feasibility validator 224 can compare the |defect($h_k$)| to the threshold c. For example, in some implementations, if the defect($h_k$)>c, then the dynamics feasibility validator 224 can determine that the motion plan 212 is not dynamically consistent. Further, in some implementations, the vehicle controller 220 (e.g., the dynamics feasibility validator 224) can provide a command to the vehicle autonomy system 210 to provide a different motion plan 212. For example, as depicted in FIG. 2, the vehicle controller 220 (e.g., the dynamics feasibility validator 224) can communicate a request to the vehicle autonomy system 210 to provide the different motion plan 212.

In some implementations, if the dynamics feasibility validator 224 determines that the motion plan 212 is dynamically consistent, the vehicle controller can generate one or more vehicle system control signals. For example, the motion plan 212 can be provided to an interpolator 226.

In some implementations, the interpolator 226 can interpolate the motion plan 212 to a particular point in time (e.g., a time step). For example, the motion plan 212 may be a motion plan for a particular time period (e.g., 5 s, 8 s, 10 s, etc.) further, the motion plan 212 may include a trajectory comprising one or more waypoints at discrete timesteps (e.g., every 100 ms). However, the motion plan 212 may not provide for trajectory values between the discrete timesteps. As an example, the interpolator 226 can interpolate the motion plan 212 to particular timesteps between the waypoints (e.g., every 10 ms). In some implementations, the interpolator 226 can interpolate to determine one or more control variables values at the particular time steps, which can be different control variable values than the control variable values at the waypoints due to the control variables changing over time.

For example, in some implementations, the interpolator 226 can use linear interpolation. For example, the interpolator 226 can determine a position (e.g., $pos_x$) using linear interpolation: $pos_x = x_0 + (x_1 - x_0) * t/T$, where $x_0$ is an initial position (at time 0), $x_1$ is an ending position at time 1, T is length of the time period between the initial position and the ending position, and t is the particular time step corresponding to an intermediate time point (e.g., a particular time step between two waypoints). Similarly, the interpolator 226 can use linear interpolation to determine other state or control variables, such as $pos_y = y_0 + (y_1 - y_0) * t/T$; $yaw = yaw_0 + (yaw_1 - yaw_0) * t/T$; etc.

In some implementations, the interpolator 226 can interpolate the one or more state variables and/or the one or more control variables using cubic spline interpolation. For example, the interpolator 226 can determine the cubic spline for $pos_x$ and $pos_y$ by solving for the polynomial coefficients that satisfy x, x', y, and y' at the sample points using the formula x (or y)=$at^3 + bt^2 + ct + d$. Once the spline of x and y have been determined, the speed, acceleration, heading angle (yaw) and curvature can be interpolated by the interpolator 226.

In some implementations, the interpolator 226 can interpolate one or more state variables and/or one or more control variables using dynamics interpolation. For example, the interpolator 226 can perform linear interpolation for the control variables using the formula $u(t) = u_k + t/h_k(u_{k+1} - u_k)$. The interpolator 226 can then use quadratic interpolation for the state variables using the continuous-time dynamics formula $x(t) = x_k + f(x_k, u_k)t + 0.5\ t^2/h_k\ [f(x_{k+1}, u_{k+1}) - f(x_k, u_k)]$.

Once the interpolator 226 has interpolated the motion plan 212 to a particular time step (e.g., determined one or more state variables and/or control variables at the particular time step), the command generator 228 can then generate one or more commands to control one or more vehicle control systems 230. Each of the vehicle control systems 230 can be configured to control one or more specialized control systems. For example, the one or more vehicle control systems can include a braking control system 232 configured to control braking (e.g., deceleration) for a vehicle, an acceleration control system 234 configured to control acceleration for the vehicle, a steering control system 236 configured to control steering for the vehicle, and/or other vehicle control systems 230.

As an example, the command generator 228 can generate vehicle control systems to implement the motion plan 212, such as by determining instructions for controlling the vehicle by adjusting the steering of the vehicle "X" degrees and/or applying a certain magnitude of braking force.

The command generator 228 can communicate (e.g., send) the vehicle system control signals to the respective vehicle control systems 230, which can cause the vehicle control systems 230 to implement the motion plan. In some implementations, the vehicle system control signals can be communicated over a network, such as a CAN. In this way, the vehicle controller 220 can validate that a motion plan 212 is dynamically consistent, and in response, control a vehicle according to the motion plan 212.

Figure 3:
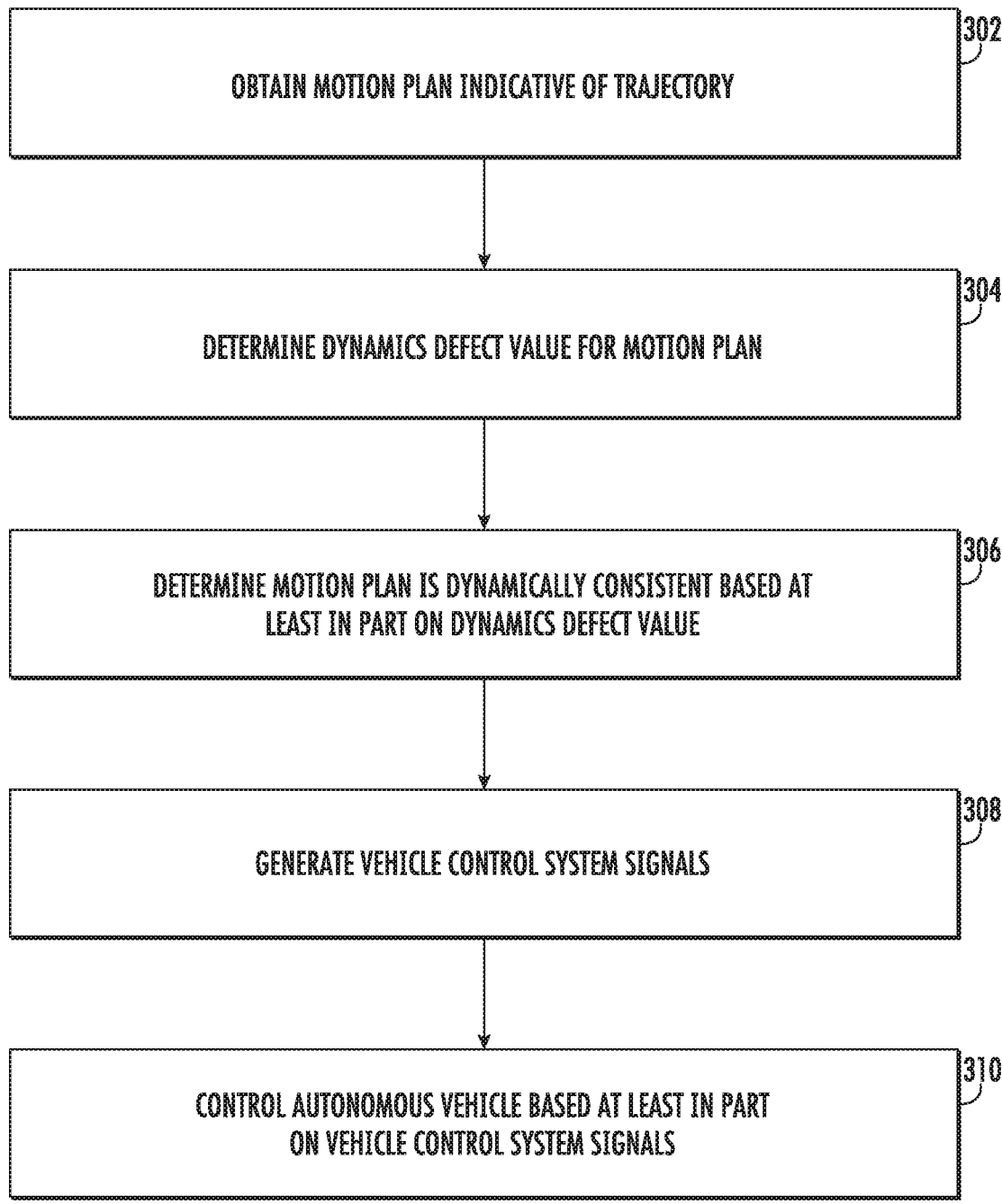
FIG. 3 depicts a flow diagram of an example method according to example aspects of the present disclosure.

FIG. 3 depicts a flow diagram of an example method 300 for validating and implementing a motion plan according to example aspects of the present disclosure. One or more portion(s) of the method 300 can be implemented by a computing system that includes one or more computing devices such as, for example, the computing systems described with reference to the other figures (e.g., the operations computing system 104, the vehicle 108, and/or the vehicle computing system 112, etc.). Each respective portion of the method 300 can be performed by any (or any combination) of one or more computing devices. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 3 is described with reference to elements/terms described with respect to other systems and figures for example illustrated purposes and is not meant to be limiting. One or more portions of method 300 can be performed additionally, or alternatively, by other systems.

At 302, the method 300 can include obtaining a motion plan indicative of a trajectory. For example, the motion plan can include one or more state variables and/or one or more control variables. In some implementations, the motion plan can be a smoothed polynomial motion plan. For example, the one or more state variables and/or the one or more control variables can be defined by one or more polynomials. In some implementations, the motion plan can be obtained from a vehicle autonomy system, such as by a vehicle controller. In some implementations, the vehicle controller can be integrated into or otherwise a part of the vehicle autonomy system.

At 304, the method 300 can include determining a dynamics defect value for the motion plan based at least in part on the one or more state variables, the one or more control variables, and a continuous-time dynamics function comprising a function indicative of a change in the one or more state variables and the one or more control variables over time. For example, in some implementations, the dynamics defect value can be determined using trapezoidal integration by multiplying a time duration parameter ($h_k$) by 0.5 and the summation of a continuous-time dynamics function at a time k+1 ($f(x_{k+1}, u_{k+1})$)) and the continuous-time dynamics function at a time k ($f(x_k, u_k)$), adding the state variable at the time k ($x_k$), and subtracting the state variable at the time k+1 ($x_{k+1}$), where $x_k$ comprises the one or more state variables at the time k, and $u_k$ comprises the one or more control variables at the time k.

At 306, the method 300 can include determining that the motion plan is dynamically consistent based at least in part on the dynamics defect value. For example, in some implementations, the dynamics defect value can be compared to a threshold c. In some implementations, the motion plan can be determined to be dynamically consistent when $-c<\text{defect}(h_k)<c$.

At 308, the method 300 can include generating one or more vehicle control system signals. For example, in response to determining a motion plan is dynamically consistent, one or more vehicle system control signals can be generated, such as control signals for a braking system, a steering system, an acceleration system, etc. In some implementations, generating the vehicle control system signals can include performing interpolation to a particular time step. For example, a motion plan can be interpolated to a particular time step using linear interpolation, cubic spline interpolation, dynamics interpolation, and/or other types of interpolation.

At 310, the method 300 can include controlling an autonomous vehicle based at least in part on the vehicle control system signals. For example, a vehicle controller can communicate or more vehicle system control signals to the respective vehicle control systems, thereby controlling an autonomous vehicle.

Figure 4:
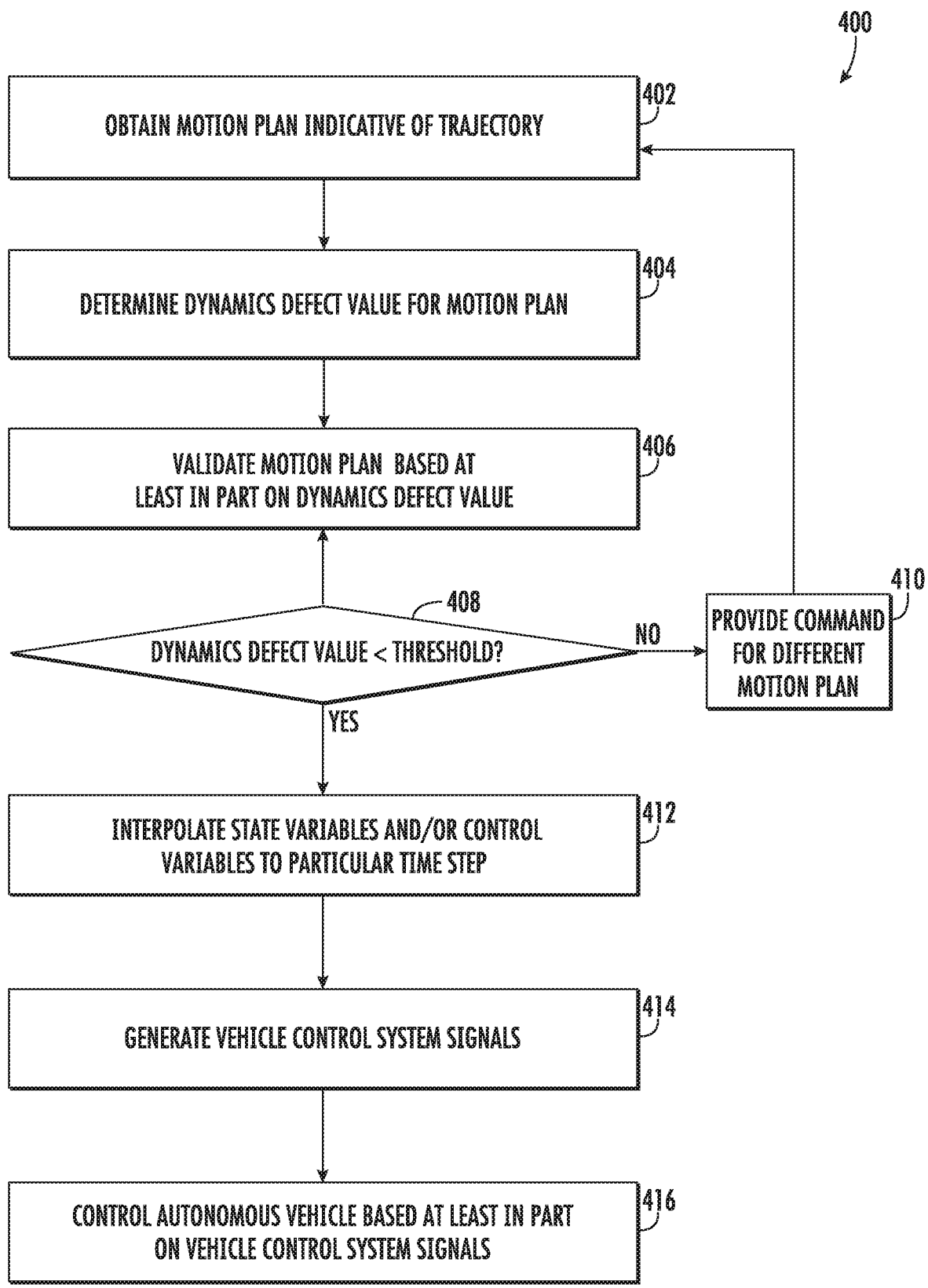
FIG. 4 depicts a flow diagram of an example method according to example aspects of the present disclosure.

FIG. 4 depicts a flow diagram of an example method 400 for validating and implementing a motion plan according to example aspects of the present disclosure. One or more portion(s) of the method 400 can be implemented by a computing system that includes one or more computing devices such as, for example, the computing systems described with reference to the other figures (e.g., the operations computing system 104, the vehicle 108, and/or the vehicle computing system 112, etc.). Each respective portion of the method 400 can be performed by any (or any combination) of one or more computing devices. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for example illustrated purposes and is not meant to be limiting. One or more portions of method 400 can be performed additionally, or alternatively, by other systems.

At 402, the method 400 can include obtaining a motion plan indicative of a trajectory. For example, the motion plan can include one or more state variables and/or one or more control variables. In some implementations, the motion plan can be a smoothed polynomial motion plan. For example, the one or more state variables and/or the one or more control variables can be defined by one or more polynomials. In some implementations, the motion plan can be obtained from a vehicle autonomy system, such as by a vehicle controller. In some implementations, the vehicle controller can be integrated into or otherwise a part of the vehicle autonomy system.

At 404, the method 400 can include determining a dynamics defect value for the motion plan based at least in part on the one or more state variables, the one or more control variables, and a continuous-time dynamics function comprising a function indicative of a change in the one or more state variables and the one or more control variables over time. For example, in some implementations, the dynamics defect value can be determined using trapezoidal integration using the equation $\text{defect}(h_k) = x_k + 0.5 * h_k * [f(x_{k+1}, u_{k+1}) + f(x_k, u_k)] - x_{k+1}$, where $(x_k, u_k)$ and $(x_{k+1}, u_{k+1})$ are the one or more state variables x and the one or more control variables u at times $t_k$ and $t_{k+1}$, $h_k$ is the duration between $t_k$ and $t_{k+1}$, and f( ) is the continuous-time dynamics function of the one or more state variables x and the one or more control variables u.

At 406, the method 400 can include validating a motion plan based at least in part on the dynamics defect value. For example, the motion plan can be validated by determining that the motion plan is dynamically consistent.

For example, in some implementations, at 408 the dynamics defect value can be compared to a threshold c. In some implementations, the motion plan can be determined to be dynamically consistent when the magnitude of the defect($h_k$) is less than c (e.g., |defect($h_k$)|<c).

If at 408, the defect($h_k$) is not less than c, then at 410, the method 400 can include providing a command for a different motion plan. For example, a vehicle controller can send a command to a vehicle autonomy system requesting a different motion plan. In some implementations, the new motion plan can then be obtained, and validated using, for example, steps 402 through 406.

If at 408 the defect($h_k$) is less than c, then at 412, the method 400 can include interpolating the one or more state variables and/or control variables to a particular time step. For example, the motion plan can be interpolated to a particular time step using linear interpolation, cubic spline interpolation, dynamics interpolation, and/or other types of interpolation.

At 414, the method 400 can include generating one or more vehicle control system signals. For example, in response to determining a motion plan is dynamically consistent, one or more vehicle system control signals can be generated, such as control signals for a braking system, a steering system, an acceleration system, etc.

At 416, the method 400 can include controlling an autonomous vehicle based at least in part on the vehicle control system signals. For example, a vehicle controller can communicate or more vehicle system control signals to the respective vehicle control systems, thereby controlling an autonomous vehicle.

Figure 5:
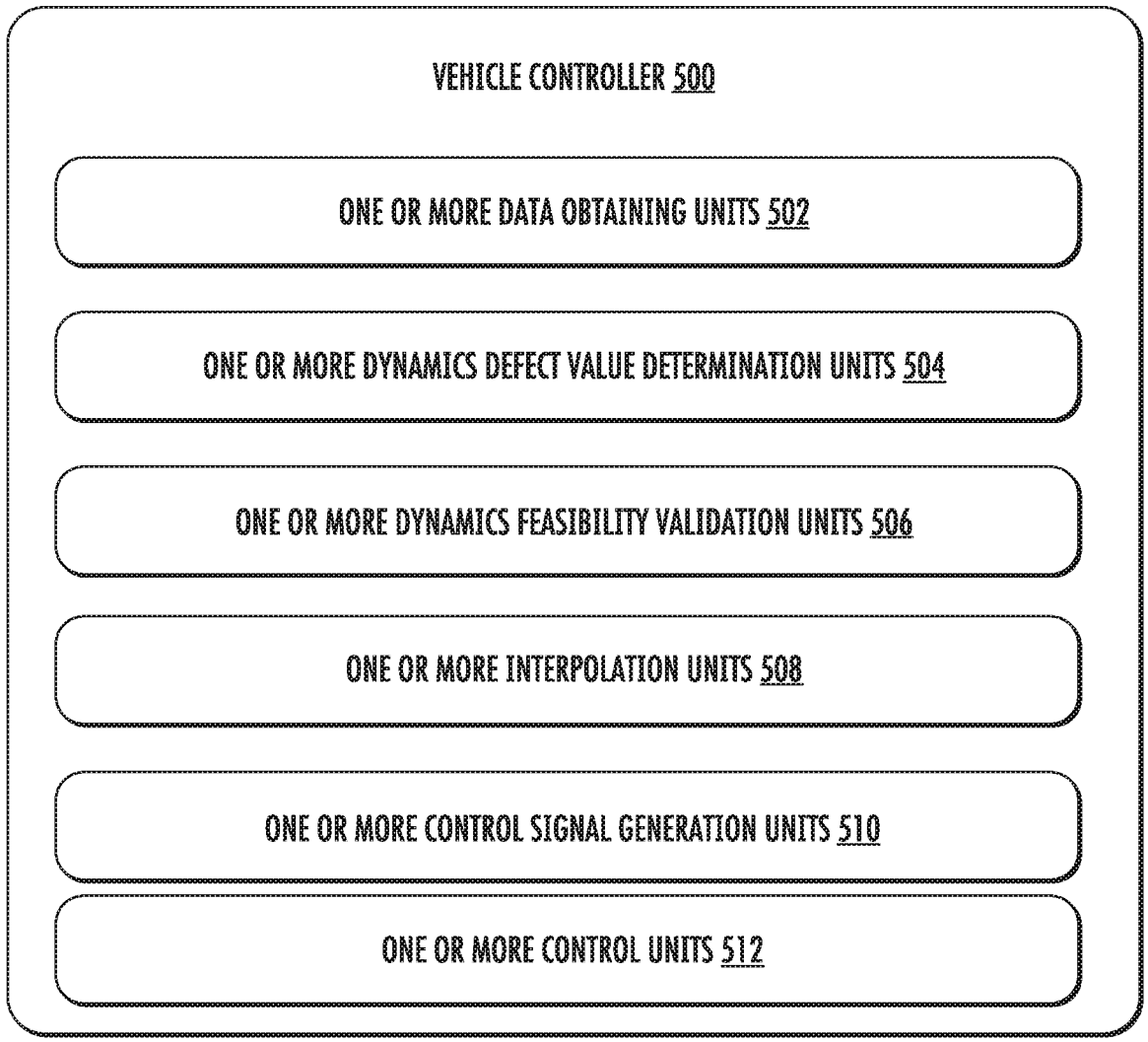
FIG. 5 depicts a diagram of an example system according to example aspects of the present disclosure.

Referring now to FIG. 5, an example vehicle controller 500 according to example aspects of the present disclosure is depicted. One or more operations and/or functions in FIG. 5 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 5 can include one or more features of one or more devices and/or systems including, for example, the operations computing system 104, the vehicle 108, or the vehicle computing system 112, which are depicted in FIG. 1.

Various means can be configured to perform the methods and processes described herein. For example, an vehicle controller 500 can include one or more data obtaining units 502, one or more dynamics defect value determination units 504, one or more dynamics feasibility validation units 506, one or more interpolation units 508, one or more control signal generation units 510, one or more control units 512, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate vehicle controller) or configured (e.g., an ASIC custom designed and configured to operate an vehicle controller) to perform one or more algorithms for performing the operations and functions described herein. For example, the means (e.g., the one or more data obtaining units 502) can be configured to obtain data. The data can be indicative of a motion plan, such as a trajectory for an autonomous vehicle. For example, the motion plan can include one or more state variables and/or one or more control variables.

The means (e.g., the one or more dynamics defect value determination units 504) can be configured to determine a dynamics defect value. The dynamics defect value data can be based at least in part on the motion plan. For example, the dynamics defect value can be determined using the equation defect($h_k$)=$x_k$+0.5*$h_k$*[f($x_{k+1}$, $u_{k+1}$)+f($x_k$, $u_k$)]−$x_{k+1}$, where ($x_k$, $u_k$) and ($x_{k+1}$, $u_{k+1}$) are the one or more state variables x and the one or more control variables u at times $t_k$ and $t_{k+1}$, $h_k$ is the duration between $t_k$ and $t_{k+1}$, and f( ) is the continuous-time dynamics function of the one or more state variables x and the one or more control variables u.

The means (e.g., the one or more dynamics feasibility validation units 506) can be configured to validate a motion plan (e.g., determine that the motion plan is dynamically consistent). For example, a motion plan can be determined to be dynamically consistent when the |defect($h_k$)| is less than a threshold c (e.g., −c<defect($h_k$)<c).

The means (e.g., the one or more interpolation units 608) can be configured to interpolate the motion plan to a particular time step. For example, the means can interpolate the motion plan to the particular time step using linear interpolation, cubic spline interpolation, dynamics interpolation, and/or other types of interpolation.

The means (e.g., one or more control signal generation units 510) can be configured to generate one or more vehicle system control signals. For example, the means can convert the motion plan at the particular time step to instructions (e.g., control signals) which can be implemented by one or more vehicle control systems. For example, a motion plan which includes decelerating at a particular time step can be converted into a braking command for a braking system.

The means (e.g., the one or more control units 510) can be configured to control an operation of the autonomous vehicle. The control of the autonomous vehicle can be based at least in part on the vehicle system control signals. For example, the means can communicate the vehicle system control signals to the respective vehicle control systems, such as over a CAN.

Figure 6:
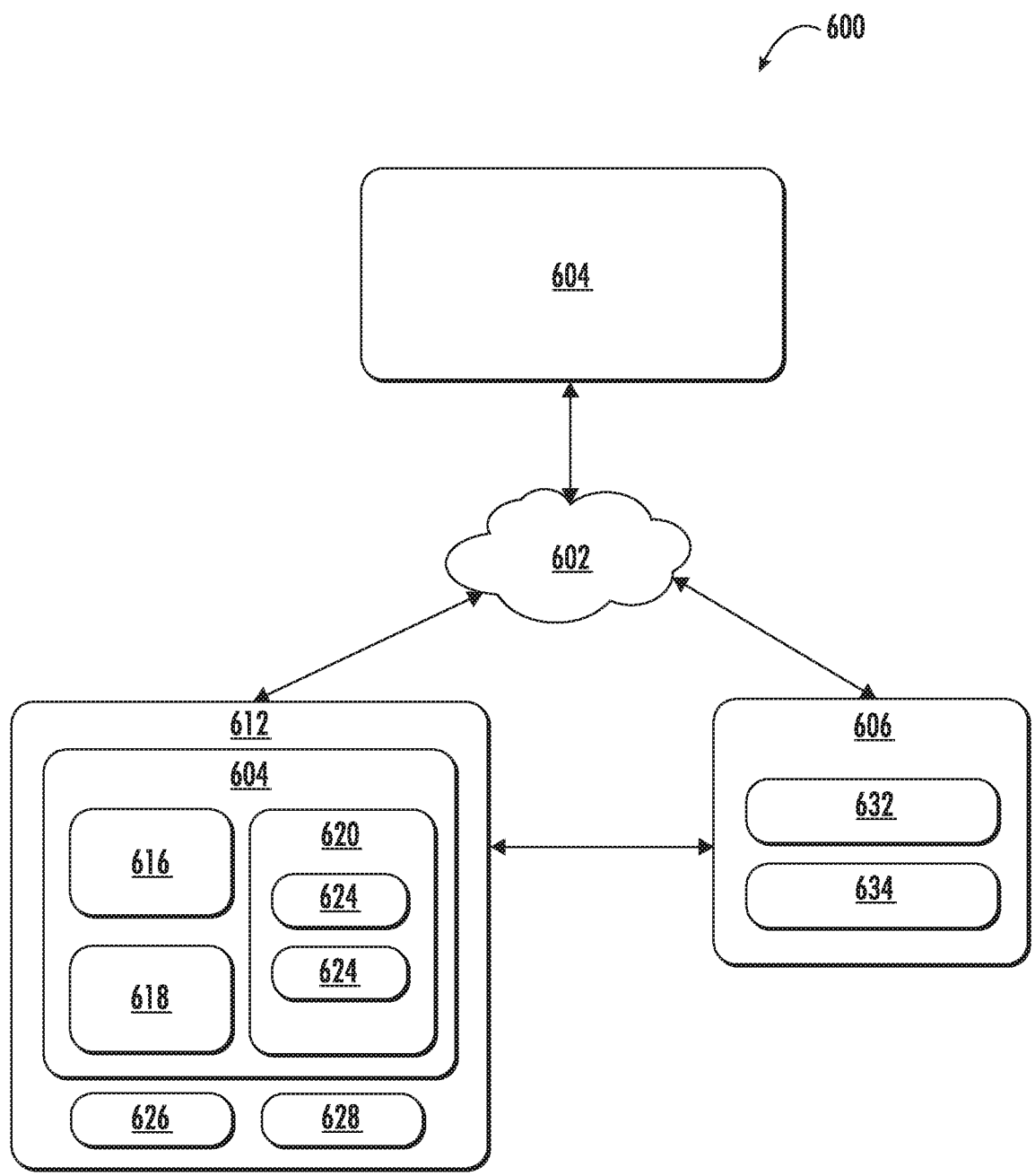
FIG. 6 depicts a diagram of an example system according to example aspects of the present disclosure.

FIG. 6 depicts a diagram of an example system 600 according to example aspects of the present disclosure. A system 600 can include a network 602 which can include one or more features of the communications network 102 depicted in FIG. 1; an operations computing system 604 which can include one or more features of the operations computing system 104 depicted in FIG. 1; one or more remote computing devices 606 which can include one or more features of the one or more remote computing devices 106 depicted in FIG. 1; a vehicle computing system 612 which can include one or more features of the vehicle computing system 112 depicted in FIG. 1; one or more computing devices 614; a communication interface 616; one or more processors 618; one or more memory devices 620; memory system 622; memory system 624; one or more input devices 626; one or more output devices 628; one or more input devices 632; and one or more output devices 634.

The vehicle computing system 612 can include the one or more computing devices 614. The one or more computing devices 614 can include one or more processors 618 which can be included on-board a vehicle including the vehicle 108 and one or more memory devices 620 which can be included on-board a vehicle including the vehicle 108. The one or more processors 618 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 618 can include a single processor or a plurality of processors that are operatively and/or selectively connected. The one or more memory devices 620 can include one or more non-transitory computer-readable storage media, such as RAM, ROM, EEPROM, EPROM, flash memory devices, magnetic disks, and/or combinations thereof.

The one or more memory devices 620 can store data or information that can be accessed by the one or more processors 618. For instance, the one or more memory devices 620 which can be included on-board a vehicle including the vehicle 108, can include a memory system 622 that can store computer-readable instructions that can be executed by the one or more processors 618. The memory system 622 can include software written in any programming language that can be implemented in hardware (e.g., computing hardware). Further, the memory system 622 can include instructions that can be executed in logically and/or virtually separate threads on the one or more processors 618. The memory system 622 can include any set of instructions that when executed by the one or more processors 618 cause the one or more processors 618 to perform operations.

For example, the one or more memory devices 620 which can be included on-board a vehicle (e.g., the vehicle 108) can store instructions, including specialized instructions, that when executed by the one or more processors 618 on-board the vehicle cause the one or more processors 618 to perform operations such as any of the operations and functions of the one or more computing devices 614 or for which the one or more computing devices 614 are configured, including any of the operations performed by the vehicle computing system 112 and/or any other operations and/or functions for operation of a vehicle, as described in the present disclosure.

The one or more memory devices 620 can include a memory system 624 that can store data that can be retrieved, manipulated, created, and/or stored by the one or more computing devices 614. The data stored in memory system 624 can include, for instance, motion plan data; dynamics defect value data; vehicle system control signal data; threshold data; data associated with one or more trajectories; state variable data; control variable data; sensor data (e.g., the one or more sensors 114 of the vehicle 108 that is described in the method 100 that is depicted in FIG. 1); data associated with one or more states of a device associated with the operations and/or functions of the vehicle computing system 612, the operations computing system 604, and/or the one or more remote computing devices 606; data generated by any of the computing systems (e.g., the vehicle computing system 112); data associated with user input; data associated with one or more actions and/or control command signals; data associated with users; the input data described herein; and/or other data or information. The data in the memory system 624 can be stored in one or more databases. The one or more databases can be split up so that the one or more databases are located in multiple locales on-board a vehicle which can include the vehicle 108. In some implementations, the one or more computing devices 614 can obtain data from one or more memory devices that are remote from a vehicle, including, for example the vehicle 108.

The system 600 can include the network 602 (e.g., a communications network) which can be used to send and/or receive signals (e.g., electronic signals) or data (e.g., data from a computing device) including signals or data exchanged between computing devices including the operations computing system 604, the one or more remote computing devices 606, and/or the vehicle computing system 612. The network 602 can include any combination of various wired (e.g., twisted pair cable) and/or wireless communication mechanisms (e.g., cellular, wireless, satellite, microwave, and radio frequency) and/or any desired network topology (or topologies). For example, the communications network 602 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 614 can also include the communication interface 616 used to communicate with one or more other systems which can be included on-board a vehicle including the vehicle 108 (e.g., over the network 602). The communication interface 616 can include any suitable components for interfacing with one or more networks, including for example, transmitters, receivers, ports, controllers, antennas, other hardware and/or software.

The vehicle computing system 612 can also include one or more input devices 626 and/or one or more output devices 628. The one or more input devices 626 and/or the one or more output devices 628 can be included and/or otherwise associated with a human-machine interface system. The one or more input devices 626 can include, for example, hardware for receiving information from a user, such as a touch screen, touch pad, mouse, a keyboard, data entry keys, and/or a microphone that can be configured to be suitable for voice recognition. The one or more output devices 628 can include one or more display devices (e.g., LCD, OLED, plasma, and/or CRT); a projector device that can project images onto a surface; and/or one or more audio output devices (e.g., loudspeakers). The one or more output devices 628 can be used to facilitate communication with a user. For example, a human operator (e.g., associated with a service provider) can communicate with a current user of a vehicle including the vehicle 108 via at least one of the display devices and/or the audio output devices.

The operations computing system 604 can include one or more computing devices configured to perform one or more operations associated with operating one or more services.

The one or more services can include one or more transportation services, courier services, and/or delivery services. Furthermore, the operations computing system 604 can include one or more processors and one or more memory devices that can be used to store data including motion plan data, dynamics defect value data, threshold data, and/or other types of data that can be stored in the memory system 624.

The one or more remote computing devices 606 can include various types of computing devices. For example, the one or more remote computing devices 606 can include a telephone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 606 can be associated with a user. The one or more remote computing devices 606 described herein can also be representative of a user device that can be included in the human machine interface system of a vehicle including the vehicle 108.

The one or more remote computing devices 606 can include one or more input devices 632 and/or one or more output devices 634. The one or more input devices 632 can include, for example, hardware for receiving information from a user, such as a touch screen, touch pad, mouse, data entry keys, speakers, and/or a microphone suitable for voice recognition. The one or more output devices 634 can include hardware for providing content for display. For example, the one or more output devices 634 can include a display device (e.g., display screen, CRT, LCD), which can include hardware for a user interface.

Furthermore, the one or more remote computing devices 606 can include one or more processors and one or more memory devices which can be used to store data including the input data, the sensor data, the training data, and/or the one or more machine-learned models that are stored in the memory system 624.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle controller, comprising:
   one or more processors;
   a memory comprising one or more tangible non-transitory computer-readable media, the media storing computer-readable instructions that when executed by the one or more processors cause the one or more processors to perform operations comprising:
   obtaining a motion plan, the motion plan indicative of a trajectory for an autonomous vehicle, the motion plan comprising one or more state variables and one or more control variables;
   determining a dynamics defect value for the motion plan based at least in part on the one or more state variables, the one or more control variables, and a continuous-time dynamics function comprising a function indicative of a change in the one or more state variables and the one or more control variables over time;
   determining the motion plan is dynamically consistent based at least in part on the dynamics defect value;
   in response to determining the motion plan is dynamically consistent, generating one or more vehicle system control signals, wherein generating the one or more vehicle system control signals comprises interpolating the one or more state variables and the one or more control variables to a particular time step by performing at least one of linear interpolation, cubic spline interpolation, or dynamics interpolation; and
   controlling the autonomous vehicle based at least in part on the one or more vehicle system control signals.

2. The vehicle controller of claim 1, wherein determining the dynamics defect value for the motion plan comprises determining a trapezoidal integration of the continuous-time dynamics function.

3. The vehicle controller of claim 2, wherein determining the trapezoidal integration comprises multiplying a time duration parameter ($h_k$) by 0.5 and the summation of a continuous-time dynamics function at a time k+1 ($f(x_{k+1}, u_{k+1})$) and the continuous-time dynamics function at a time k ($f(x_k, u_k)$), adding the state variable at the time k ($x_k$), and subtracting the state variable at the time k+1 ($x_{k+1}$), where $x_k$ comprises the one or more state variables at the time k, and $u_k$ comprises the one or more control variables at the time k.

4. The vehicle controller of claim 1, wherein determining the motion plan is dynamically consistent based at least in part on the dynamics defect value comprises determining that the dynamics defect value is less than a threshold.

5. The vehicle controller of claim 1, wherein interpolating the one or more state variables and the one or more control variables to the particular time step comprises performing linear interpolation.

6. The vehicle controller of claim 1, wherein interpolating the one or more state variables and the one or more control variables to the particular time step comprises performing cubic spline interpolation.

7. The vehicle controller of claim 1, wherein interpolating the one or more state variables and the one or more control variables to the particular time step comprises performing dynamics interpolation; and
   wherein performing dynamics interpolation comprises quadratic interpolation.

8. The vehicle controller of claim 1, wherein the motion plan comprises a smoothed polynomial motion plan.

9. The vehicle controller of claim 1, wherein the one or more state variables comprise at least one of a position, velocity, acceleration, yaw, curvature, odometer, or a change in curvature.

10. The vehicle controller of claim 1, wherein the one or more control variables comprise at least one of a jerk or ddcurv, the second derivative of curvature.

11. The vehicle controller of claim 1, wherein controlling the autonomous vehicle based at least in part on the one or more vehicle system control signals comprises sending the one or more vehicle system control signals to one or more vehicle control systems.

12. A method for controlling an autonomous vehicle, comprising:
    obtaining, by a computing system comprising one or more computing devices, a motion plan, the motion plan indicative of a trajectory for an autonomous vehicle, the motion plan comprising one or more state variables and one or more control variables;
    determining, by the computing system, a dynamics defect value for the motion plan based at least in part on the one or more state variables, the one or more control variables, and a continuous-time dynamics function comprising a function indicative of a change in the one or more state variables and the one or more control variables over time;
    determining, by the computing system, whether the motion plan is dynamically consistent based at least in part on the dynamics defect value;
    in response to determining the motion plan is dynamically consistent, generating one or more vehicle system control signals, wherein generating the one or more vehicle system control signals comprises interpolating the one or more state variables and the one or more control variables to a particular time step by performing at least one of linear interpolation, cubic spline interpolation, or dynamics interpolation; and
    controlling the autonomous vehicle based at least in part on the one or more vehicle system control signals.

13. The method of claim 12, wherein determining, by the computing system, the dynamics defect value for the motion plan comprises determining, by the computing system, a trapezoidal integration of the continuous-time dynamics function.

14. The method of claim 13, wherein determining, by the computing system, the trapezoidal integration comprises determining the dynamics defect value according to the following equation:

$$\text{dynamics defect} = x_k + 0.5 * h_k * [f(x_{k+1}, u_{k+1}) + f(x_k, u_k)] - x_{k+1};$$

wherein $(x_k, u_k)$ and $(x_{k+1}, u_{k+1})$ are the one or more state variables x and the one or more control variables u at times $t_k$ and $t_{k+1}$, respectively;
wherein $h_k$ is a duration between $t_k$ and $t_{k+1}$; and
wherein f( ) is the continuous-time dynamics function of the one or more state variables x and the one or more control variables u.

15. The method of claim 12, further comprising:
in response to determining the motion plan is not dynamically consistent, providing, by the computing system, a command to provide a different motion plan.

16. An autonomous vehicle, comprising:
    a vehicle autonomy system comprising one or more processors, the vehicle autonomy system configured to generate a motion plan, the motion plan indicative of a trajectory for the autonomous vehicle, the motion plan comprising one or more state variables and one or more control variables; and
    a vehicle controller comprising
        one or more processors; and
        a memory comprising one or more tangible non-transitory computer-readable media, the media storing computer-readable instructions that when executed by the one or more processors cause the one or more processors to perform operations comprising:
            obtaining, from the vehicle autonomy system, the motion plan;
            determining a dynamics defect value for the motion plan based at least in part on the one or more state variables, the one or more control variables, and a continuous-time dynamics function comprising a function indicative of a change in the one or more state variables and the one or more control variables over time;
            validating the motion plan based at least in part on the dynamics defect value;
            in response to validating the motion plan, generating one or more vehicle system control signals, wherein generating the one or more vehicle system control signals comprises interpolating the one or more state variables and the one or more control variables to a particular time step by performing at least one of linear interpolation, cubic spline interpolation, or dynamics interpolation; and
            controlling the autonomous vehicle based at least in part on the one or more vehicle system control signals.

17. The autonomous vehicle of claim 16, wherein determining the dynamics defect value comprises determining the dynamics defect value according to the following equation:

$$\text{dynamics defect} = x_k + 0.5 * h_k * [f(x_{k+1}, u_{k+1}) + f(x_k, u_k)] - x_{k+1};$$

wherein $(x_k, u_k)$ and $(x_{k+1}, u_{k+1})$ are the one or more state variables x and the one or more control variables u at times $t_k$ and $t_{k+1}$, respectively;
wherein $h_k$ is a duration between $t_k$ and $t_{k+1}$; and
wherein f( ) is the continuous-time dynamics function of the one or more state variables x and the one or more control variables u.

* * * * *